United States Patent [19]

Uchida

[11] 3,760,228

[45] Sept. 18, 1973

[54] PROTECTING CIRCUIT

[75] Inventor: Kozo Uchida, Tokyo, Japan

[73] Assignee: Iwatsu Electric Co. Ltd., Tokyo, Japan

[22] Filed: Oct. 5, 1972

[21] Appl. No.: 295,260

[52] U.S. Cl. ............ 317/31, 317/33 R, 317/33 SC, 317/43

[51] Int. Cl. ............ H02h 3/20

[58] Field of Search ............ 317/31, 33 R, 33 VR, 317/33 SC, 43

[56] References Cited

UNITED STATES PATENTS

| | | | |
|---|---|---|---|
| 3,178,617 | 4/1965 | Coker | 317/33 R |
| 3,209,205 | 9/1965 | Olson | 317/33 R |
| 3,313,985 | 4/1967 | White | 317/33 R |
| 3,654,518 | 4/1972 | Phelps et al. | 317/33 R |

*Primary Examiner*—James D. Trammell
*Attorney*—Richard E. Kurtz

[57] ABSTRACT

A protecting circuit of this invention comprises a transistor circuit proof against higher voltage, connected in series between one circuit having the possibility that the overvoltage is supplied to it, and another circuit to be protected against the overvoltage, a resistance circuit supplying a base current to a transistor of the said transistor circuit, a detecting resistance connected in series with the said transistor circuit proof against higher voltage, a control circuit connected in series with the said resistance circuit supplying the base current and connected to control the said transistor circuit proof against higher voltage by the ON-OFF operation depending on the growth of the voltage drop across the said detecting resistance, a diode circuit proof against higher voltage, connected in series with the said transistor circuit proof against higher voltage to prevent a higher reverse voltage from being applied to the said transistor circuit proof against higher voltage, and a diode connected essentially in parallel with the said circuit to be protected against the overvoltage and connected so as to keep a conductive state when the overvoltage is supplied to the said circuit having the possibility that the overvoltage is supplied to it. It has normally little influence on the supply of a current, and functions to protect a circuit when the overvoltage is applied.

9 Claims, 15 Drawing Figures

PROTECTING CIRCUIT

BACKGROUND OF THE INVENTION

This invention related to a protecting circuit for any electrical circuit, and particularly for a digital multi-meter.

A digital multi-meter is already known by which a voltage, a current, a resistance, a capacitance and the like can be measured on the basis of the principle of a digital voltmeter. In the performance of the desired measurement by the digital multi-meter of this kind, after the digital multi-meter is set by the change-over range, a circuit to be measured, is connected to the measuring terminals of the digital multi-meter. Persons familiar with the handling of the digital multi-meter are not the only who employ the digital multi-meter, but also persons not familiar with the handling of the digital multi-meter sometimes employ the digital multi-meter. Persons not familiar with the handling of the digital multi-meter often, by mistake, measure a voltage not by a voltage-range, but by a resistance-range. In such a misoperation, the voltage of the circuit to be measured is supplied to the circuit of the resistance-range in the digital multi-meter and a great current flows through the digital multi-meter often to burn out it, if the voltage is higher.

A protecting circuit to protect the digital multi-meter from the burning-out by the above-mentioned misoperation, as shown in FIG. 1, is known. FIG. 1 shows a circuit to measure a resistance by the digital multi-meter provided with the protecting device. Terminals 5, 6 of the digital multi-meter are connected to a resistance 4 to the measured, as shown by the value $R_2$ of the resistance in FIG. 1, a constant current source 1 is connected to the resistance 4 to be measured, to supply it with the constant current and a digital voltmeter 3 is connected to the resistance 4. A protecting circuit 2 for the digital multi-meter comprises a resistance 11 shown by the value $R_1$ of the resistance connected between the terminal 5 and the output terminal 12 of the constant current source 1, one diode 7 connected between one end of the resistance 11 and a positive bias terminal 9, and another diode 8 connected between another end of the resistance 11 and a negative bias terminal 10.

When the digital voltmeter 3 is set in a 2 volts range and a current of 10mA is supplied from the constant current source 1, the digital voltmeter 3 indicates a full scale in the value of the resistance $R_2$ of 200 ohms. When the resistance 11 has the value $R_1$ of the resistance of 1,000 ohms, the positive bias terminal 9 the bias voltage of +15V, the negative bias terminal 10 the bias voltage of −15V, and the resistance 4 the value $R_2$ of the resistance of under 200 ohms, the voltage at the output terminal 12 of the constant current source 1 is under 12 volts, and both the diode 7 and the diode 8 are in an off-state, so that the resistance can be tested without any influence of the diode 7, 8.

When a voltage circuit of 100 volts, not the resistance 4, is by misoperation connected between the terminals 5 and 6, then a positive voltage supplied to the terminal 5 makes the diode 7 conductive, while a negative voltage suppled to the terminal 5 makes the diode 8 conductive, whereby a current flows through a circuit from the terminal 5 to the bias terminal 9 through the resistance 11 and the diode 7, or through a circuit from the terminal 5 to the bias terminal 10 through the resistance 11 and the diode 8. The following current i flows through the resistance 11.

$$i = 100V - 15V/1,000 \text{ ohms} = 85mA$$

By the conducting of such the current through the diode 7 or 8, the voltage at the output terminal of the constant current source 1 is controlled to the voltage at the bias terminal 9 or 10, whereby the constant current source 1 is protected against the overvoltage supplied to the terminals 5, 6. Consequently, the constant current source 1 can be, to some extent, prevented against the overvoltage by such circuit. However, with higher voltage supplied to the terminals 5, 6, greater current $i$ flows through the circuit to burn out all or a part of the diodes 7, 8, the resistance 11 and the circuits connected to the bias terminals 9, 10. To prevent the burning-out, the value $R_1$ of the resistance 11 can be greater, but 1,000 ohms × 10mA = 10V drop in the resistance 11 of $R_1$ = 1,000 ohms and so the output voltage of the constant current source 1 must be greater with the increase of the value of the resistance 11. The price of the constant current source 1 and the loss of electric power increases with the output voltage of the constant current source 1. Since the input impedance of the digital voltmeter 3 is extremely high, it can be protected against the overvoltage up to about 1,000 volts, but the digital multi-meter on the measurement of the resistance can be protected against the overvoltage up to only 50 to 200 volts on the above-mentioned grounds. The resistance range in the digital multi-meter is very weak against the overvoltge, compared with the voltage range.

The protection of the resistance-measuring circuit in the digital multi-meter is above-mentioned. However, the above-mentioned defects exist also in different resistance-measuring circuits and all of the equipments provided with the circuits having the possibility that the overvoltage is supplied to them.

BRIEF SUMMARY OF THE INVENTION

An object of the invention is to provide a protecting circuit by means of which the overvoltage supplied by mistake to the first circuit has no influence on the second circuit.

Another object of the invention is to provide a protecting circuit which has little influence on the operation of a main circuit, when the main circuit is in a normal state.

A further object of the invention is to provide a protecting circuit in which the loss of electric power and the voltage drop is little.

A further object of the invention is to provide a protecting circuit which can protect the main circuit against the higher overvoltage.

A further object of the invention is to provide a resistance-measuring equipment which utilizes a digital voltmeter protected against the overvoltage.

A further object of the invention is to provide a digital multi-meter protected against the overvoltage.

A further object of the invention is to provide a protecting circuit requiring no specific power source.

A further object of the invention is to provide a more accurate resistance-measuring circuit utilizing a digital voltmeter.

A protecting circuit according to the invention comprises a transistor circuit proof against higher voltage, connected in series between one circuit having the possibility that the overvoltage is supplied to it, and another circuit to be protected against the overvoltage, a resistance circuit supplying a base current to a transistor of the said transistor circuit, a detecting resistance connected in series with the said transistor circuit proof against higher voltage, a control circuit connected in series with the said resistance circuit supplying the base current and connected to control the said transistor circuit proof against higher voltage by the ON-OFF operation depending on the growth of the voltage drop in the said detecting resistance, a diode circuit proof against higher voltage connected in series with the said transistor circuit proof against higher voltage to prevent a higher reverse voltage from being applied to the said transistor circuit proof against higher voltage, and a diode connected essentially in parallel with the said circuit to be protected against the overvoltage and connected so as to keep a conductive state when the overvoltage is supplied to the said circuit having the possibility that the overvoltage is supplied to it.

The above and other objects, features and advantages of this invention will become apparent from the following detailed description of illustrative embodiments shown in the accompanying drawings.

DESCRIPTION OF THE PREFERRED EMBODIMENTS

Figure 1:
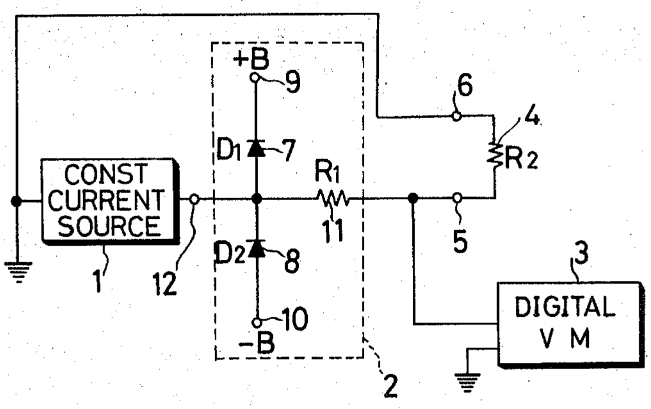
FIG.1 PRIOR ART
FIG. 1 is a circuit-digram showing a protecting circuit of prior art for the resistance-measuring circuit by means of the digital multi-meter.

Referring to the drawings, the embodiments according to the invention are now described.

Figure 2:
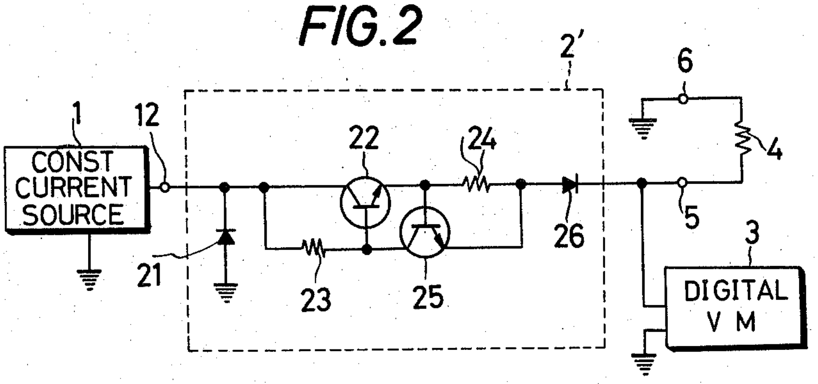
FIG. 2 is a circuit-diagram showing the first embodiment of the protecting circuit for the resistance-measuring circuit by means of the digital multi-meter, according to the invention.

In the FIG. 2 showing the first embodiment, a constant current source 1 is connected to terminals 5 and 6 between which a resistance 4 to be measured, is connected. And a digital voltmeter 3 is to measure a voltage betwen the terminals 5 and 6, is connected to the terminals 5 and 6. A protecting circuit 2' is connected between the terminal 5 and the output terminal 12 of the constant current source 1 to protect the constant current source 1 against the overvoltage.

The protecting circuit 2' consists of diodes 21, 26, transistors 22, 25, and resistances 23, 24. The diode 21 with an extremely small reverse current is connected in parallel with the output stage of the constant current source 1, the anode of which is connected to the earth. The diode 26 proof against higher voltage, the detecting resistance 24 with a relatively small value, and the transistor 22 proof against higher voltage are connected in series between the terminal 5 and the output terminal 12 of the constant current source 1. The resistance 23 with a high value is connected between the collector electrode and the base electrode of the transistor 22 proof against higher voltage to the base electrode of which the collector electrode of the control transistor 25 is connected. The emitter electrode of the control transistor 25 is connected to one end of the detecting resistance 24 and the base electrode of the control transistor 25 is connected to another end of the detecting resistance 24.

Next, the operation of the protecting circuit 2 as above-mentioned, is described. In the connection of the resistance 4 between the terminals 5, 6 as shown in FIG. 2, the current flowing through the resistance 24 with a relatively small value, such as 50 ohms, is 10 nA to 10 mA, and so the voltage across the resistance 24 is not so great enough to maintain the control transistor 25 in an ON state, whereby the current flowing through the resistance 23 does not flow into the control transistor 25, but flows into the base electrode of the transistor 22 proof against higher voltage to maintain the transistor 22 in a conductive state. The diode 26 is in a conductive state, since the output terminal 12 of the constant current source 1 is designed to be in a positive potential. And since the diode 21 is connected in a direction to block the current, the diode 21 is not conductive. Only the reverse current with an extremely small value, such as 10 pA, flows through the diode 21. Since the reverse current is very small in comparison with the current from the constant current source 1, it has little influence on the accuracy of the measurement. For instance, the resitance 23 has the value of about 100 Kohms. The constant current from the constant current source 1 is supplied to the resistance 4 to be measured under the voltage drop of several volts in the transistor 22 and the little voltage drops in the resistance 24 and the diode 26 to measure the voltage drop proportional to the resistance 4 by the digital voltmeter 3. And so the value of the resistance 4 to be measured, can be measured in a relatively low output voltage of the constant current source 1. Next, the case that a high voltage circuit, not the resistance 4, by misoperation, is connected to the terminals 5, 6, is described. When positive 1,000 volts is supplied to the terminal 5, the positive 1,000 volts is applied toward the constant current source 1. But as the diode 26 proof against over reverse 1,000 volts is employed, the 1,000 volts supplied to the terminal 5 is blocked by the diode 26 to protect the constant current source 1. When negative 1,000 volts is supplied to the terminal 5, the diodes 26, 21 are conductive, whereby the current flows from the diode 21 to the diode 26 through the transistor 22 and the resistance 24, and it brings about the voltage drop in the resistance 24 to put the control transistor 25 into a conductive state. When the control transistor 25 is conductive, the base current of the transistor 22 decreases and the resistance of the transistor 22 or the resistance between the emitter and the collector of the transistor 22 increases much. In the transistor 22 employing an element or a transistor circuit in which transistors are connected in series, both of which are proof against more than 1,000 volts, the voltage drop between the emitter and the collector is about 998 volts. And the current flowing through the resistance 24 with the value of 50 ohms is controlled to about 14 mA, and the emitter current of the transistor 25 is controlled to about 10 mA. The voltage drop across the conducting diode 21 is about 0.7 volts, and so the voltage of about munus 0.7 volts is applied to the constant current source 1. Consequently, even when the overvoltage of about 1,000 volts is, by mistake, applied to the protecting circuit 2' or toward the constant current source 1, the constant current source 1 and the protecting circuit 2' are protected against the overvoltage.

By the above-mentioned protecting circuit 2', the voltage drop and the loss of electric power between the constant current source 1 and the terminal 5 are reduced, whereby the output voltage of the constant current source 1 can be lowered to reduce the price of the constant current source 1. And the circuits are protected against the positive or negative higher voltage. The protecting circuit 2' does not require a specific power source. Moreover, in the normal measurement of the resistance, the fluctuation of the current supplied to the resistance 4 to be measured, connected to the terminal 5, from the constant current source 1, is extremely small, since all of the current from the constant current source 1 are supplied to the resistance 4. Consequently, very accurate measurement is possible.

Figure 3:
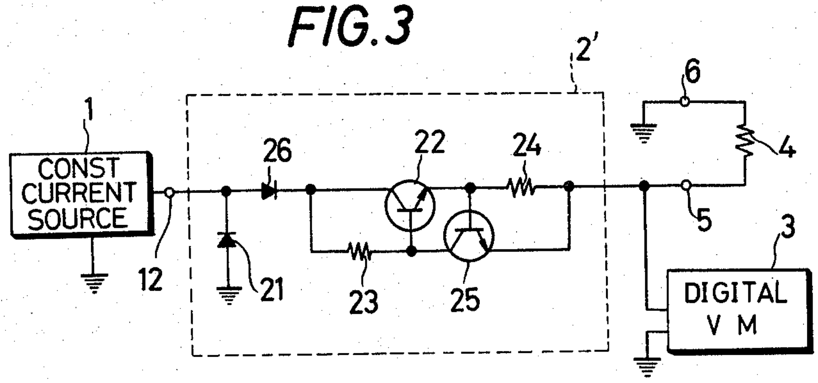
FIG. 3 is a circuit-diagram showing the second embodiment of the protecting circuit according to the invention.

FIG. 3 shows the second embodiment of the invention. Because the embodiment is a modification of the first embodiment, the parts illustrated in FIG. 3 which are similar to corresponding parts of FIG. 2, carry the same designation numerals. In the embodiment, a diode 26 proof against higher voltage is connected between the output terminal 12 of the constant current source 1 and the collector electrode of the transistor 22 proof against higher voltage. In spite of the diode 26 proof against higher voltage being connected like this, the embodiment performs the same operation as the first embodiment.

Figure 4:
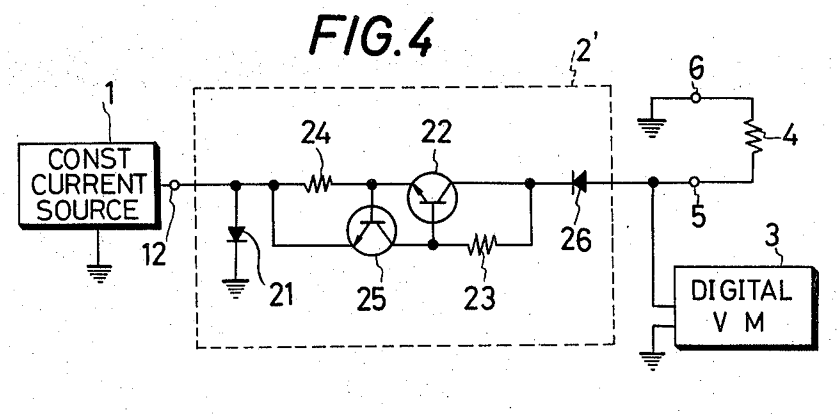
FIG. 4 is a circuit-diagram showing the third embodiment of the protecting circuit according to the invention.

FIG. 4 shows the third embodiment the invention. Because also the embodiment is a modification of the first embodiment, the parts illustrated in FIG. 4 which are similar to corresponding parts of FIG. 2, carry the same designation numerals. The difference of the embodiment from the first embodiment consists in the fact that the polarity of the output terminal of the constant current source 1 is negative, and the diode 26 proof against higher voltage, the diode 21, the transistor 22 proof against higher voltage and the transistor 25 are connected in a direction reverse to that in FIG. 2, respectively. Substantially the same operation and effect as in the first embodiment, are performed by such arrangement.

Figure 5:
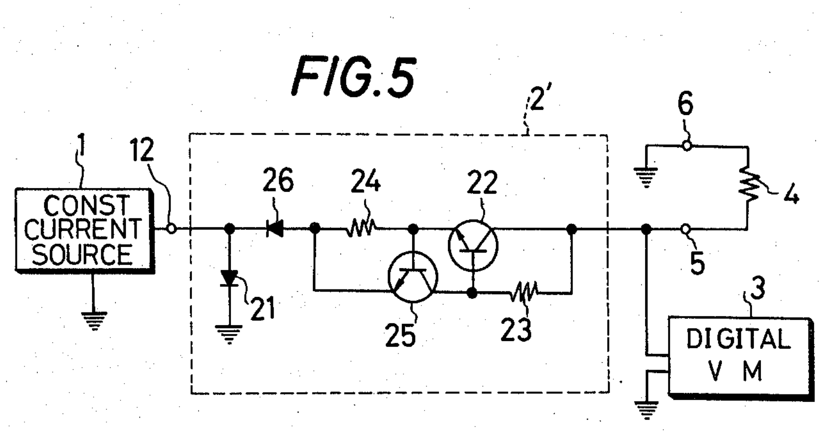
FIG. 5 is a circuit-diagram showing the fourth embodiment of the protecting circuit according to the invention.

FIG. 5 shows the fourth embodiment of the invention. Because the embodiment is a modification of the embodiment shown in FIG. 3, the parts illustrated in FIG. 5 which are similar to corresponding parts of FIG. 3, carry the same designation numerals. The difference of the embodiment from the embodiment shown in FIG. 3, consists in the fact that the polarity of the output terminal 12 of the constant current source 1 is negative in this embodiment and the diodes 21, 26, and the transistor 22, 25 are connected in a direction reverse to that in the embodiment shown in FIG. 3, respectively. Substantially the same operation and effect as in the embodiment shown in FIG. 3, are performed by such arrangement.

Figure 6:
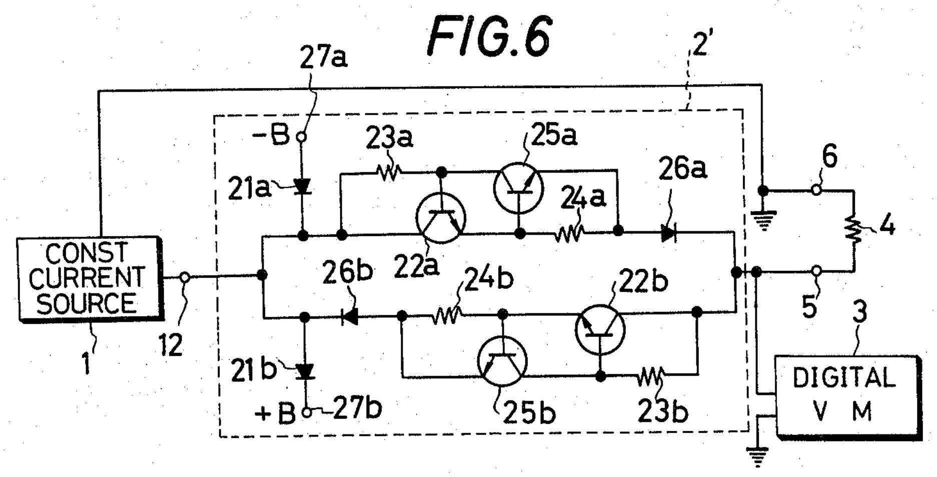
FIG. 6 is a circuit-diagram showing the fifth embodiment of the protecting circuit according to the invention.

FIG. 6 shows the fifth embodiment of the invention. The protecting circuit 2' in this emnbodiment is formed by a parallel connection of the protecting circuit shown in FIG. 2 and the protecting circuit shown in FIG. 5. One circuit consisting of a transistor **22*a* proof against higher voltage, a detecting resistance 24*a*, a diode 26*a* proof against higher voltage, a high resistance 23*a*, a control transistor 25*a*, a diode 21*a* with a small reverse current and a negative bias terminal 27*a*, is connected to let a current toward the terminal 5 from the output terminal 12 of the constant current source 1, or a positive half cycle of alternating current, flow. An other circuit consisting of a transistor 22*b* proof against higher voltage, a detecting resistance 24*b*, a diode 26*b* proof against higher voltage, a high resistance 23*b*, a control transistor 25*b*, a diode 26*b* with a small reverse current and a positive bias terminal 27*b*, is connected to let a current toward the output terminal 12 of the constant current source 1 from the terminal 5, or a negative half cycle of alternative current, flow. On the measurement of the resistance by such the protecting circuit 2', an alternative current is supplied to the resistance 4 to be measured, by the terminal 12 — the transistor 22*a* proof against higher voltage — the resistance 24*a* — the diode 26*a* proof against higher voltage — the terminal 5 circuit, and the terminal 5 — the transistor 22*b* proof against higher voltage — the resistance 24*b* — the diode 26b proof against higher voltage — the terminal 12 circuit. On the normal operation, little current flows through the diodes 21*a* and 21*b*, since they are reversely biased by the bias voltages supplied to to the negative bias terminal 27*a* and the positive bias terminal 27*b*, respectively. When a high voltage is, by mistake, applied to the terminals 5 and 6, the high voltage or the overvoltage is blocked by the protecting circuit 2' is not applied to the constant current source 1**, as in the above embodiments.

Figure 7:
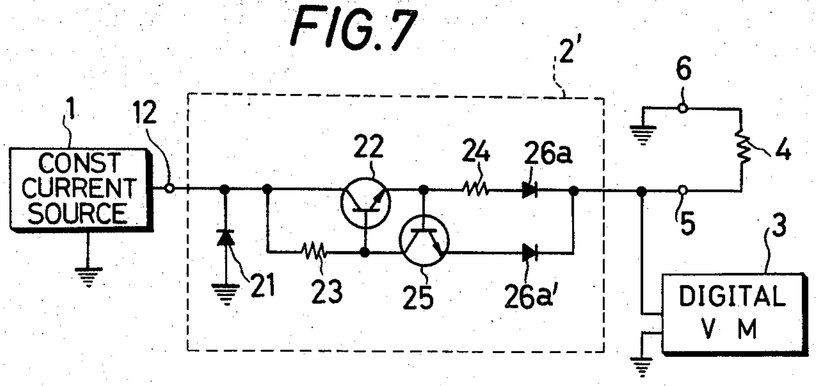
FIG. 7 is a circuit-diagram showing the sixth embodiment of the protecting circuit according to the invention.

FIG. 7 shows the sixth embodiment of the invention. This embodiment is a modification of the embodiment shown in FIG. 2, in which diodes **26*a* and 26*a'* are connected instead of the diode 26 proof against higher voltage in FIG. 2**. The same operation and effect as in the embodiment shown in FIG. 2, are performed by such arrangement, too.

Figure 8:
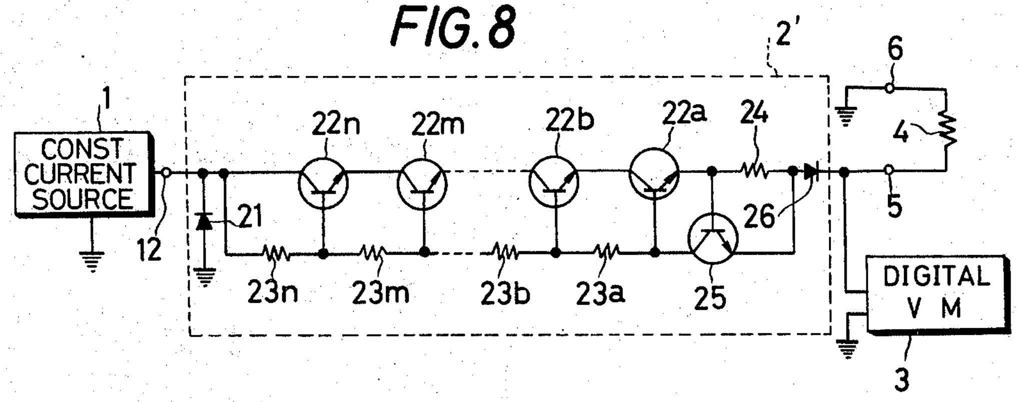
FIG. 8 is a circuit-diagram showing the seventh embodiment of the protecting circuit according to the invention.

FIG. 8 shows the seventh embodiment of the invention. This embodiment is essentially the same as the embodiment shown in FIG. 2. In the embodiment, a plurality of transistors 22a, 22b . . . 22m, 22n are connected in series instead of the transistor 22 to form a transistor circuit proof against higher voltage. And a plurality of resistances 23a, 23b . . . 23m, 23n are connected in series instead of the resistance 23 to form a circuit supplying a current to the bases of the transistors 22a, 22b . . . 22m, 22n. Even when a transistor proof against comparatively low voltage is employed, the higher overvoltage is blocked by such arrangements. When the same transistor proof against higher voltage as the transistor in the above embodiments, is employed in series, the circuit can be protected against extremely high voltage. As the above transistor circuit, a plurality of diodes may be connected in series instead of the diode 26 proof against higher voltage to form a circuit proof against higher voltage.

Figure 9:
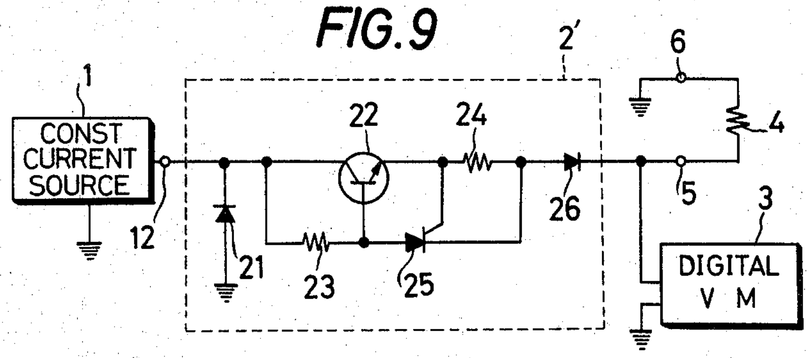
FIG. 9 is a circuit-diagram showing the eighth embodiment of the protecting circuit according to the invention.

FIG. 9 shows the eighth embodiment of the invention. In the protecting circuit of this embodiment, a thyristor 25' is substituted for the transistor 25 in the circuit shown in FIG. 2. A cathode electrode of the thyristor 25' is connected to one end of the resistance 24, and a gate electrode of the thyristor 25' is connected to another end of the resistance 24.

Such arrangement performs the same operation as the circuit shown in FIG. 2. In the connection of the resistance 4 to be measured between the terminals 5, 6, the current flowing through the resistance 24 with a relatively small value, such as 50 ohms, is 10 nA to 10 mA, and so the voltage drop across the resistance 24 is not so great enough to maintain the thyristor 25' in an ON state, whereby the current flowing through the resistance 23 flows into the base electrode of the transistor 22 proof against higher voltage to maintain the transistor 22 in a conductive state. The diode 26 is in a conductive state, since the output terminal 12 of the constant current source 1 is designed to be in a positive potential. And since the diode 21 is connected in a direction to block the current, the diode 21 is not conductive. Only the reverse current with an extremely small value, such as 10 pA, flows through the diode 21. Since the reverse current is very small in comparison with the current from the constant current source 1, it has little influence on the accuracy of the measurement. Thus, a constant current flows from the constant current source 1 to the resistance 4, and the value of the resistance 4 can be measured by the digital voltmeter 3.

Next, the case that a high voltage circuit, instead of the resistance 4, by misoperation, is connected to the terminals 5, 6, is described. When a positive 1,000 volts is supplied to the terminal 5, the positive 1,000 volts is applied toward the constant current source 1. But as the diode 26 proof against over reverse 1,000 volts is employed, the 1,000 volts supplied to the terminal 5 is blocked by the diode 26 to protect the constant current source 1. When a negative 1,000 volts is supplied to the terminal 5, the diodes 21, 26 become conductive, whereby the current flows from the diode 21 to the diode 26 through the transistor 22 and the resistance 24, and it brings about the voltage drop in the resistance 24 to give a trigger-signal to the gate-electrode of the thyristor 25' and put the thyristor 25' into a conductive state. When the thyristor 25' is conductive, the base-current of the transistor 22 decreases and the resistance of the transistor 22 or the resistance between the emitter and the collector of the transistor 22 increases much. In the transistor 22 proof against more than 1,000 volts, the voltage drop between the emitter and the collector is about 998 volts. And the current flowing through the resistance 24 with the value of 50 ohms is controlled to about 14 mA and the current flowing through the thyristor 25' is controlled to about 10 mA. The thyrister 25' is maintained in a conductive state owing to its nature. The voltage drop across the conducting diode 21 is about 0.7 volts, and so the voltage of about minus 0.7 volts is applied to the constant current source 1. Consequently, even when the overvoltage of about 1,000 volts is, by mistake, applied to the protecting circuit 2' or toward the constant current source 1, the protecting circuit 2' and the constant current source 1 are protected against the overvoltage.

Figure 10:
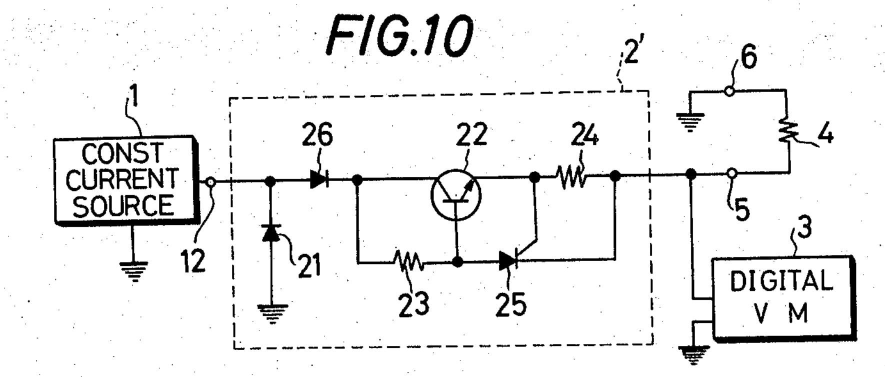
FIG. 10 is a circuit-diagram showing the ninth embodiment of the protecting circuit according to the invention.

FIG. 10 shows the ninth embodiment of the invention. This embodiment is a modification of the circuit shown in FIG. 9. In the embodiment, a diode 26 proof against higher voltage is connected between the output terminal 12 of the constant current source 1 and the collector electrode of the transistor 22 proof against higher voltage. Although the diode 26 proof against higher voltage is connected in such a manner, substantially, the same operation and effect as in the circuit shown in FIG. 9, are obtained in this embodiment.

Figure 11:
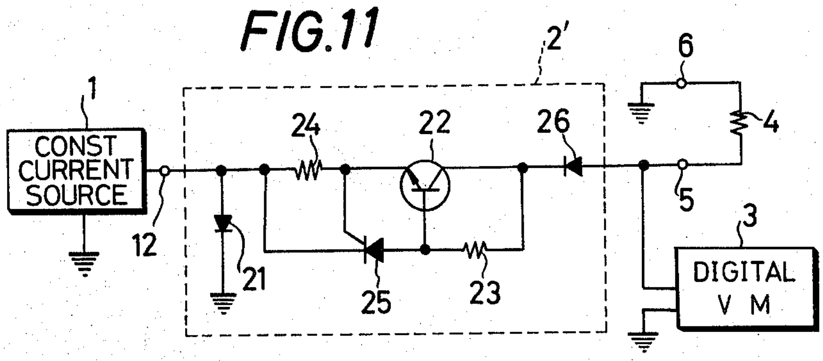
FIG. 11 is a circuit-diagram showing the tenth embodiment of the protecting circuit according to the invention.

FIG. 11 shows the tenth embodiment of the invention. Also this embodiment is substantially the same as the embodiment shown in FIG. 9, but in this embodiment, the polarity of the output terminal 12 of the constant current source 1 is negative. Therefore, the diode 26 proof against higher voltage, the diode 21, the transistor 22 proof against higher voltage and the thyristor 25 are connected in a direction opposite to that of the connection in FIG. 9. Substantially the same operation and effect as in the circuit of FIG. 9, are performed by such arrangement.

Figure 12:
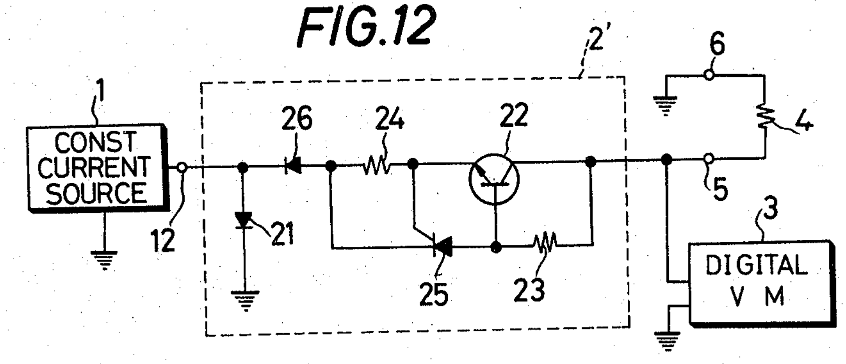
FIG. 12 is a circuit-diagram showing the eleventh embodiment of the protecting circuit according to the invention.

FIG. 12 shows the eleventh embodiment of the invention. This embodiment is a modification of the circuit shown in FIG. 10. In this embodiment, the polarity of the output terminal 12 of the constant current source 1 is negative. Therefore, in this embodiment, the diodes 21, 26, the transistor 22 and the thyristor 25 are connected in a direction opposite to that of the connection in FIG. 10. Substantially the same operation and the effect as in the circuit shown in FIG. 10 are performed by such arrangement.

Figure 13:
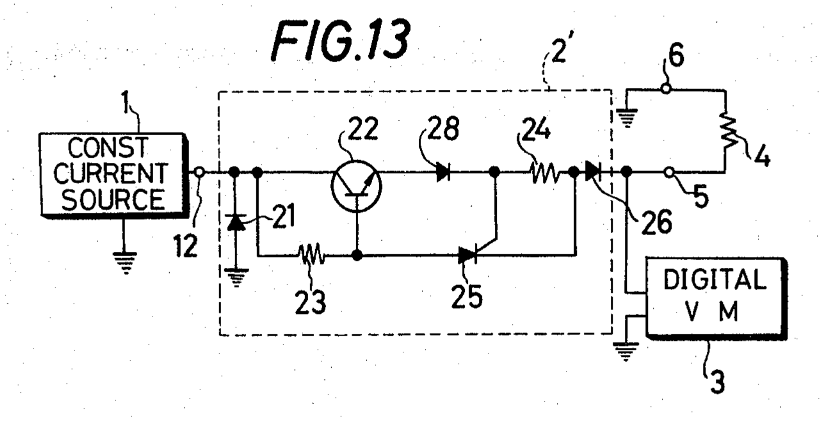
FIG. 13 is a circuit-diagram showing the twelfth embodiment of the protecting circuit according to the invention.

FIG. 13 shows the twelfth embodiment of the invention. This embodiment is a modification of the circuit shown in FIG. 9. In this embodiment, a diode 28 is connected to the emitter electrode of the transistor 22 in consideration of the case that the voltage between the anode and the cathode of the thyristor 25 is not so low enough to put the transistor 22 into an OFF state when the thyristor 25 is in an ON state. When the diode 28 is connected in such a manner, the transistor 22 can be put perfectly into a non-conductive state.

Figure 14:
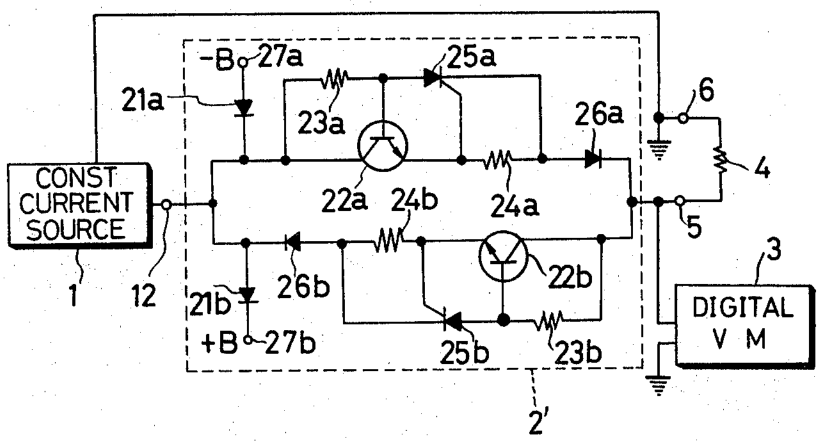
FIG. 14 is a circuit-diagram showing the thirteenth embodiment of the protecting circuit according to the invention.

FIG. 14 shows the thirteenth embodiment of the invention. This embodiment is formed by a pararell connection of the protecting circuit shown in FIG. 9 with the protecting circuit shown in FIG. 12 to protect a circuit supplying an alternative current. One circuit consisting of a transistor 22a proof against higher voltage, a detecting resistance 24a, a diode 26a proof against higher voltage, a high resistance 23a, a thyristor 25a, a diode 21*a* with a small reverse current and a negative bias terminal 27*a*, is connected to let a current toward the terminal 5 from the output terminal 12 of the constant current source 1 flow. Another circuit consisting of a transistor 22*b* proof against higher voltage, a detecting resistance 24*b*, a diode 26*b* proof against higher voltage, a high resistance 23*b*, a thyristor 25*b*, a diode 26*b* with a small reverse current and a positive bias terminal 27*b*, is connected to let a current toward the output terminal 12 of the constant current source 1 from the terminal 5 flow. On the measurement of the resistance by such protecting circuit 2', an alternative current is supplied to the resistance 4 to be measured, by the terminal 12 — the transistor 22*a* proof against higher voltage — the resistance 24*a* — the diode 26*a* proof against higher voltage — the terminal 5 circuit, and the terminal 5 — the transistor 22*b* proof against higher voltage — the resistance 24*b* — the diode 26*b* proof against higher voltage — the terminal 12 circuit. On the normal operation, little current flows through the diodes 21*a* and 21*b*, since they are reversely biased by the bias voltages supplied to the negative bias terminal 27*a* and the positive bias terminal 27*b*, respectively. When a high voltage is, by mistake, applied to the terminals 5 and 6, the high voltage or the overvoltage is blocked by the protecting circuit 2' and is not applied to the constant current source 1, as in the above embodiment.

Figure 15:
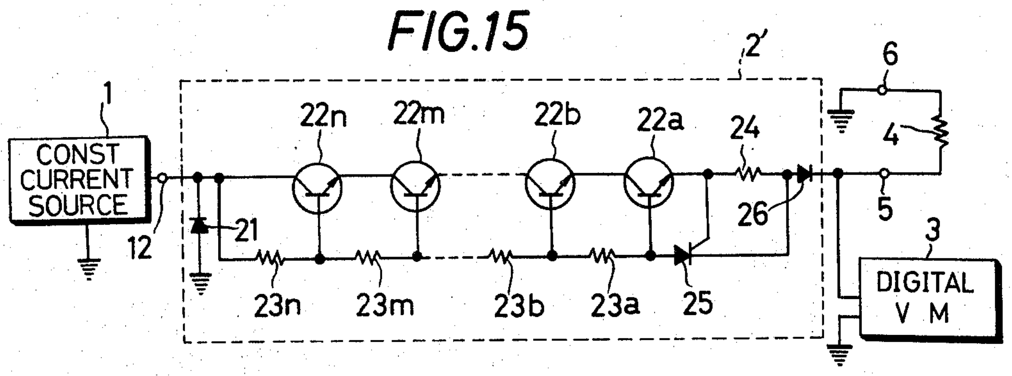
FIG. 15 is a circuit-diagram showing the fourteenth embodiment of the protecting circuit according to the invention.

FIG. 15 shows the fourteenth embodiment of the invention. This embodiment is essentially the same as the embodiment shown in FIG. 9. This embodiment is different from the embodiment shown in FIG. 9 in the fact that a plurality of transistors 22*a*, 22*b* . . . 22*m*, 22*n* are connected in series instead of the transistor 22 to form a transistor circuit proof against higher voltage, and a plurality of resistances 23*a*, 23*b* . . . 23*m*, 23*n* are connected in series instead of the resistance 23 to form a circuit supplying a current to the bases of the transistor 22*a*, 22*b* . . . 22*m*, 22*n*. Even when a transistor proof against comparatively low voltage is employed, the higher overvoltage is blocked by such arrangements. When the same transistor proof against higher voltage as the transistor in the above embodiments, is employed, the circuit can be protected against extremely high voltage.

The embodiments of this invention have been described in the above, but it is possible to modify the above embodiments. For instance, instead of the diode 26 proof against higher voltage, a plurality of diodes may be connected in series. Moreover, the diode 26 proof against higher voltage, may be connected between the output terminal 12 of the constant current source 1 and the diode 21. But in this case, a diode proof against higher voltage must be employed as the diode 21. One end of the diode 21 is connected to earth in the embodiments shown in FIGS. 2 to 5, FIGS. 7 to 13 and FIG. 15, but a power source with a low impedance may be substituted for earth in such a manner that the diode is in an OFF-state when normally operated, and it is in an ON-state when the overvoltage is applied to the terminal 5. The above embodiments have been applied to the resistance-range of the digital multimeter, but the protecting circuit of the invention is not limited to it, and may be widely applied to any other measuring instrument, any power circuit or different circuits having the possibility that the higher voltage is by mistake applied to them.

What is claimed is:

1. A protecting circuit for protecting an electrical circuit against the overvoltage, comprising a transistor circuit proof against higher voltage, connected in series between one circuit having the possibility that the overvoltage is supplied to it, and another circuit to be protected against the overvoltage, a resistance circuit supplying a base current to a transistor of the said transistor circuit, a detecting resistance connected in series with the said transistor circuit proof against higher voltage, a control circuit connected in series with the said resistance circuit supplying the base current and connected to control the said transistor circuit proof against higher voltage by the ON-OFF operation depending on the growth of the voltage drop across the said detecting resistance, a diode circuit proof against higher voltage, connected in series with the said transistor circuit proof against higher voltage to prevent a higher reverse voltage from being applied to the said transistor circuit proof against higher voltage and a diode connected essentially in parallel with the said circuit to be protected against the overvoltage and connected so as to keep a conductive state when the overvoltage is supplied to the said circuit having the possibility that the overvoltage is supplied to it.

2. A protecting circuit according to claim 1, wherein the said control circuit is a transistor between the base and the emitter of which the voltage across the said detecting resistance is applied.

3. A protecting circuit according to claim 1, wherein the said control circuit is a thyristor between the cathode and the gate of which the voltage across the said detecting resistance is applied.

4. A protecting circuit according to claim 1, wherein the said transistor circuit proof against higher voltage is formed of a plurality of transistors connected in series with one another.

5. A protecting circuit according to claim 1, wherein the said diode circuit proof against higher voltage is formed of a plurality of diodes connected in series with one another.

6. A protecting circuit according to claim 1, wherein the said transistor circuit proof against higher voltage is connected between the resistance-measuring terminals of the digital multi-meter, and the constant current source.

7. A protecting circuit for protecting an electrical circuit against the overvoltage comprising:

the first protecting circuit comprising the first transistor circuit proof against higher voltage, connected in series between one circuit having the possibility that the overvoltage is supplied to it, and another circuit to be protected against the overvoltage, the first resistance circuit supplying a base current to a transistor of the said first transistor circuit, the first detecting resistance connected in series with the said first transistor circuit proof against higher voltage, the first control circuit connected in series with the said first resistance circuit supplying the base current and connected to control the said first transistor circuit proof against higher voltage by the ON-OFF operation depending on the growth of the voltage drop across the said first detecting resistance, the first diode circuit proof against higher voltage, connected in series with the said first transistor circuit proof against higher voltage to prevent a higher reverse voltage from being applied to the said first transistor circuit proof against higher voltage, and the first diode connected essentially in parallel with the said circuit to be protected against the overvoltage and connected so as to keep a conductive state when the overvoltage is supplied to the said circuit having the possibility that the overvoltage is supplied to it, and the second protecting circuit comprising the second transistor circuit proof against higher voltage, connected in series between one circuit having the possibility that the overvoltage is supplied to it, and another circuit to be protected against the overvoltage, and connected in polarity opposite to the said first transistor circuit proof against higher voltage, the second resistance circuit supplying a base current to a transistor of the said second transistor circuit, the second detecting resistance connected in series with the said second transistor circuit proof against higher voltage, the second control circuit connected in series with the said second resistance circuit supplying the base current and connected to control the said second transistor circuit proof against higher voltage by the ON-OFF operation depending on the growth of the voltage drop across the said second detecting resistance, the second diode circuit proof against higher voltage, connected in series with the said second transistor circuit proof against higher voltage to prevent a higher reverse voltage from being applied to the said second transistor circuit proof against higher voltage, and connected in polarity opposite to the said first diode circuit proof against higher voltage, and the second diode connected essentially in parallel with the said circuit to be protected against the overvoltage and connected so as to keep a conductive state when the overvoltage is supplied to the said circuit having the possibility that the overvoltage is supplied to it.

8. A protecting circuit according to claim 7, wherein the said first control circuit and the said second control circuit are formed of transistor.

9. A protecting circuit according to claim 7, wherein the said first control circuit and the said second control circuit are formed of thyristors.

* * * * *